US012754893B2

(12) United States Patent
Garnaes

(10) Patent No.: US 12,754,893 B2
(45) Date of Patent: Oct. 6, 2026

(54) USING CONDENSED BITMAP REPRESENTATION FOR FILTERING OF DATASETS

(71) Applicant: WORKDAY, INC., Pleasanton, CA (US)

(72) Inventor: Andreas Garnaes, Copenhagen (DK)

(73) Assignee: WORKDAY, INC., Pleasanton, CA (US)

( * ) Notice: Subject to any disclaimer, the term of this patent is extended or adjusted under 35 U.S.C. 154(b) by 0 days.

(21) Appl. No.: 18/813,654

(22) Filed: Aug. 23, 2024

(65) Prior Publication Data

US 2024/0419646 A1 Dec. 19, 2024

Related U.S. Application Data

(63) Continuation of application No. 17/578,647, filed on Jan. 19, 2022, now Pat. No. 12,079,186.

(51) Int. Cl.
*G06F 16/22* (2019.01)

(52) U.S. Cl.
CPC ................................ *G06F 16/2237* (2019.01)

(58) Field of Classification Search
CPC .................................................. G06F 16/2237
USPC ......................................................... 707/745
See application file for complete search history.

(56) References Cited

U.S. PATENT DOCUMENTS 6,282,540 B1 * 8/2001 Goldensher ............. G06F 16/29 707/753
7,231,387 B2 * 6/2007 Sauermann ....... G06F 16/24545 707/999.005
11,379,476 B2 7/2022 Petride
11,789,936 B2 * 10/2023 Chen .................. G06F 16/2379 707/607
2020/0401589 A1 12/2020 Arkhangorodsky
2022/0019590 A1 * 1/2022 Hankinson .......... G06F 16/2237
2022/0366440 A1 * 11/2022 Shinde ............... G06Q 30/0204

* cited by examiner

*Primary Examiner* — Giovanna B Colan
(74) *Attorney, Agent, or Firm* — James J. DeCarlo; Greenberg Traurig, LLP

(57) ABSTRACT

Disclosed are techniques for increasing the speed of pair-wise comparison operations in a database system. In an embodiment, a method is disclosed comprising receiving a network request identifying a user; identifying a plurality of segments associated with the user; loading a plurality of bitmaps associated with the plurality of segments, each bitmap in the plurality of bitmaps representing a set of users associated with a segment; comparing pairs of bitmaps from the plurality of bitmaps to generate a set of overlaps; filtering the plurality of segments based on the set of overlaps to generate an anonymized set of segments; and returning aggregated data associated with the anonymized set of segments in response to the network request.

20 Claims, 7 Drawing Sheets

USING CONDENSED BITMAP REPRESENTATION FOR FILTERING OF DATASETS

CROSS-REFERENCE TO RELATED APPLICATIONS

This application is continuation of and claims the benefit of U.S. application Ser. No. 17/578,647, which is incorporated by reference in its entirety.

BACKGROUND

The example embodiments are directed towards bitmap operations in real-time computing systems and, particularly, utilizing condensed bitmaps to improve the speed of dataset comparisons in a real-time computing system.

Currently, computing systems (e.g., databases, application servers, etc.) often perform a set-wise comparison of data to return results to network devices in order to preserve anonymity. For small datasets, a naïve approach of comparing each dataset to all others can be used, given the small number of datasets. However, for larger datasets, such an approach is infeasible or impossible given the compute and network capabilities of current technology. Thus, many systems simply forego such operations since current technology cannot timely fulfill such requests at the scale of network requests (e.g., milliseconds).

BRIEF SUMMARY

The example embodiments solve these and other problems by providing condensed bitmap-based techniques for storing dataset memberships and operations thereon to rapidly return overlapping segments. The identification of overlapping segments can then be used to modify a return value of a network request to provide only anonymized data in response to a user request. As one example, a survey response system can be modified to anonymize survey data prior to returning aggregate statistics by comparing segment membership in advance and filtering those segment pairs that only differ by a specified number of users (thus allowing for reverse engineering of survey response data). The techniques, however, can be applied to any system using set-based comparisons.

In some aspects, the techniques described herein relate to a method including: receiving, by a processor, a network request, the network request identifying a user; identifying, by the processor, a plurality of segments associated with the user; loading, by the processor, a plurality of bitmaps associated with the plurality of segments, each bitmap in the plurality of bitmaps representing a set of users associated with a segment; comparing, by the processor, pairs of bitmaps from the plurality of bitmaps to generate a set of overlaps; filtering, by the processor, the plurality of segments based on the set of overlaps to generate an anonymized set of segments; and returning, by the processor, aggregated data associated with the anonymized set of segments in response to the network request.

In some aspects, the techniques described herein relate to a method, wherein the plurality of bitmaps includes compressed bitmaps.

In some aspects, the techniques described herein relate to a method, wherein loading the plurality of bitmaps includes reading a database column from a segment table.

In some aspects, the techniques described herein relate to a method, wherein returning the aggregated data associated with the anonymized set of segments includes returning a response that omits aggregated data associated with the filtered segments.

In some aspects, the techniques described herein relate to a method, further including maintaining a historical set of overlaps, the historical set of overlaps including a set of previously computed overlaps and wherein comparing pairs of bitmaps includes querying the historical set of overlaps to obtain a cached set of overlaps.

In some aspects, the techniques described herein relate to a method, further including: receiving response data associated with a second user; identifying a plurality of matching segments for the second user; and updating a plurality of matching bitmaps corresponding to the plurality of matching segments using an identifier of the second user.

In some aspects, the techniques described herein relate to a method, further including: computing a set of matching overlaps based on the plurality of matching bitmaps; and storing the set of matching overlaps.

In some aspects, the techniques described herein relate to a non-transitory computer-readable storage medium for tangibly storing computer program instructions capable of being executed by a computer processor, the computer program instructions defining steps of: receiving a network request, the network request identifying a user; identifying a plurality of segments associated with the user; loading a plurality of bitmaps associated with the plurality of segments, each bitmap in the plurality of bitmaps representing a set of users associated with a segment; comparing pairs of bitmaps from the plurality of bitmaps to generate a set of overlaps; filtering the plurality of segments based on the set of overlaps to generate an anonymized set of segments; and returning aggregated data associated with the anonymized set of segments in response to the network request.

In some aspects, the techniques described herein relate to a non-transitory computer-readable storage medium, wherein the plurality of bitmaps includes compressed bitmaps.

In some aspects, the techniques described herein relate to a non-transitory computer-readable storage medium, wherein loading the plurality of bitmaps includes reading a database column from a segment table.

In some aspects, the techniques described herein relate to a non-transitory computer-readable storage medium, wherein returning aggregated data associated with the anonymized set of segments includes returning a response that omits aggregated data associated with the filtered segments.

In some aspects, the techniques described herein relate to a non-transitory computer-readable storage medium, the steps further including maintaining a historical set of overlaps, the historical set of overlaps including a set of previously computed overlaps and wherein comparing pairs of bitmaps includes querying the historical set of overlaps to obtain a cached set of overlaps.

In some aspects, the techniques described herein relate to a non-transitory computer-readable storage medium, the steps further including: receiving response data associated with a second user; identifying a plurality of matching segments for the second user; and updating a plurality of matching bitmaps corresponding to the plurality of matching segments using an identifier of the second user.

In some aspects, the techniques described herein relate to a non-transitory computer-readable storage medium, further including: computing a set of matching overlaps based on the plurality of matching bitmaps; and storing the set of matching overlaps.

In some aspects, the techniques described herein relate to a device including: a processor; and a storage medium for tangibly storing thereon program logic for execution by the processor, the stored program logic including: logic, executed by the processor, for receiving a network request, the network request identifying a user; logic, executed by the processor, for identifying a plurality of segments associated with the user; logic, executed by the processor, for loading a plurality of bitmaps associated with the plurality of segments, each bitmap in the plurality of bitmaps representing a set of users associated with a segment; logic, executed by the processor, for comparing pairs of bitmaps from the plurality of bitmaps to generate a set of overlaps; logic, executed by the processor, for filtering the plurality of segments based on the set of overlaps to generate an anonymized set of segments; and logic, executed by the processor, for returning aggregated data associated with the anonymized set of segments in response to the network request.

In some aspects, the techniques described herein relate to a device, wherein the plurality of bitmaps includes compressed bitmaps.

In some aspects, the techniques described herein relate to a device, wherein loading the plurality of bitmaps includes reading a database column from a segment table.

In some aspects, the techniques described herein relate to a device, wherein returning aggregated data associated with the anonymized set of segments includes returning a response that omits aggregated data associated with the filtered segments.

In some aspects, the techniques described herein relate to a device, the program logic further including logic, executed by the processor, for maintaining a historical set of overlaps, the historical set of overlaps including a set of previously computed overlaps and wherein comparing pairs of bitmaps includes querying the historical set of overlaps to obtain a cached set of overlaps.

In some aspects, the techniques described herein relate to a device, the program logic further including: logic, executed by the processor, for receiving response data associated with a second user; logic, executed by the processor, for identifying a plurality of matching segments for the second user; and logic, executed by the processor, for updating a plurality of matching bitmaps corresponding to the plurality of matching segments using an identifier of the second user.

DETAILED DESCRIPTION

Figure 1:
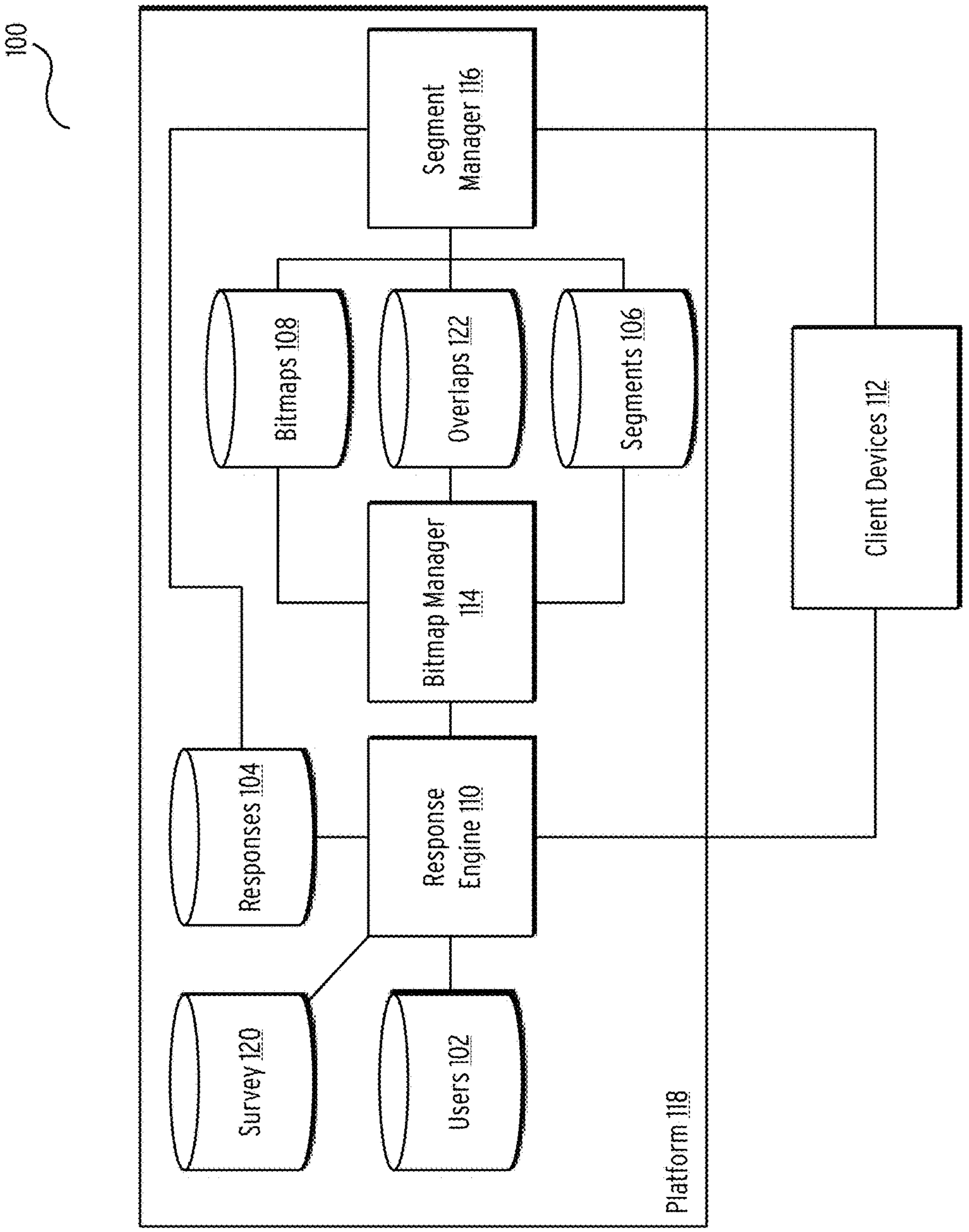
FIG. 1 is a block diagram of a system for providing bitmaps operations on segments according to some of the example embodiments.

FIG. 1 is a block diagram of a system for providing bitmaps operations on segments according to some of the example embodiments.

In an embodiment, the system 100 includes a network platform 118 that can receive and respond to network requests issued by client devices 112. In some embodiments, network platform 118 can comprise a server (or set of servers) implementing a network service such as a website, application programming interface (API), or other types of network services. The client devices 112 can issue network requests over a network (not illustrated) such as a public Internet, private intranet, or other wide or local area networks. Examples of network requests include, but are not limited to, Hypertext Transfer Protocol (HTTP) requests, remote procedure call (RPC) requests, etc. In general, however, any type of network request that can include data may be used.

In an embodiment, the client devices 112 communicate with various network endpoints and processes of network platform 118. Two examples of such endpoints or processes include a response engine 110 and a segment manager 116. While only two endpoints or processes are depicted, network platform 118 can include other additional endpoints or processes, and the disclosure is not limited to a system that implements only response engine 110 and segment manager 116.

In an embodiment, the response engine 110 processes requests and responses for managing user responses. One example of a user response is a response to a survey question. For example, network platform 118 can comprise a human resources (HR) platform that periodically issues survey requests to end-users (e.g., job satisfaction questions, progress report quests, etc.). The specific type of questions, or the use of surveys, is not limiting. Indeed, any response data that can or should be associated with a user can be used as response data in network platform 118. In some embodiments, the responses can be numeric (e.g., ratings on a defined scale) to enable aggregation across multiple similar responses/questions.

In an embodiment, the segment manager 116 can access a user database 102, survey database 120, and a response database 104. The segment manager 116 can periodically load a survey question from survey database 120 and one or more users from user database 102 to generate per-user survey questions. In an embodiment, these per-user survey questions can be stored in response database 104 pending a response from each user. In some embodiments, segment manager 116 can transmit the survey questions to users as they log in to the network platform 118 (e.g., in a designated area of a website or mobile application). When a user responds to the survey question, the client devices 112 transmit the response to the network platform 118 and, specifically, to the segment manager 116. In response, segment manager 116 can load the unanswered survey question from response database 104 and update the unanswered survey question with the received response. The segment manager 116 can then write the answered survey question back to response database 104. The foregoing description provides a general overview of a survey-response system, and various details are omitted for the sake of brevity.

Indeed, any system that can generate per-user survey questions and store answered per-user survey questions (or similar data) could be used.

In existing systems, responses can be aggregated across segments, and aggregate answers can be provided for a segment. For example, a segment of users in an engineering department can be aggregated (e.g., a mean computed) for a single question, and the aggregated answer can be provided as the segment response to the single question. However, when performing such an aggregation, risks of de-anonymizing users can occur. One example of this risk is presented in FIG. 5.

Figure 5:
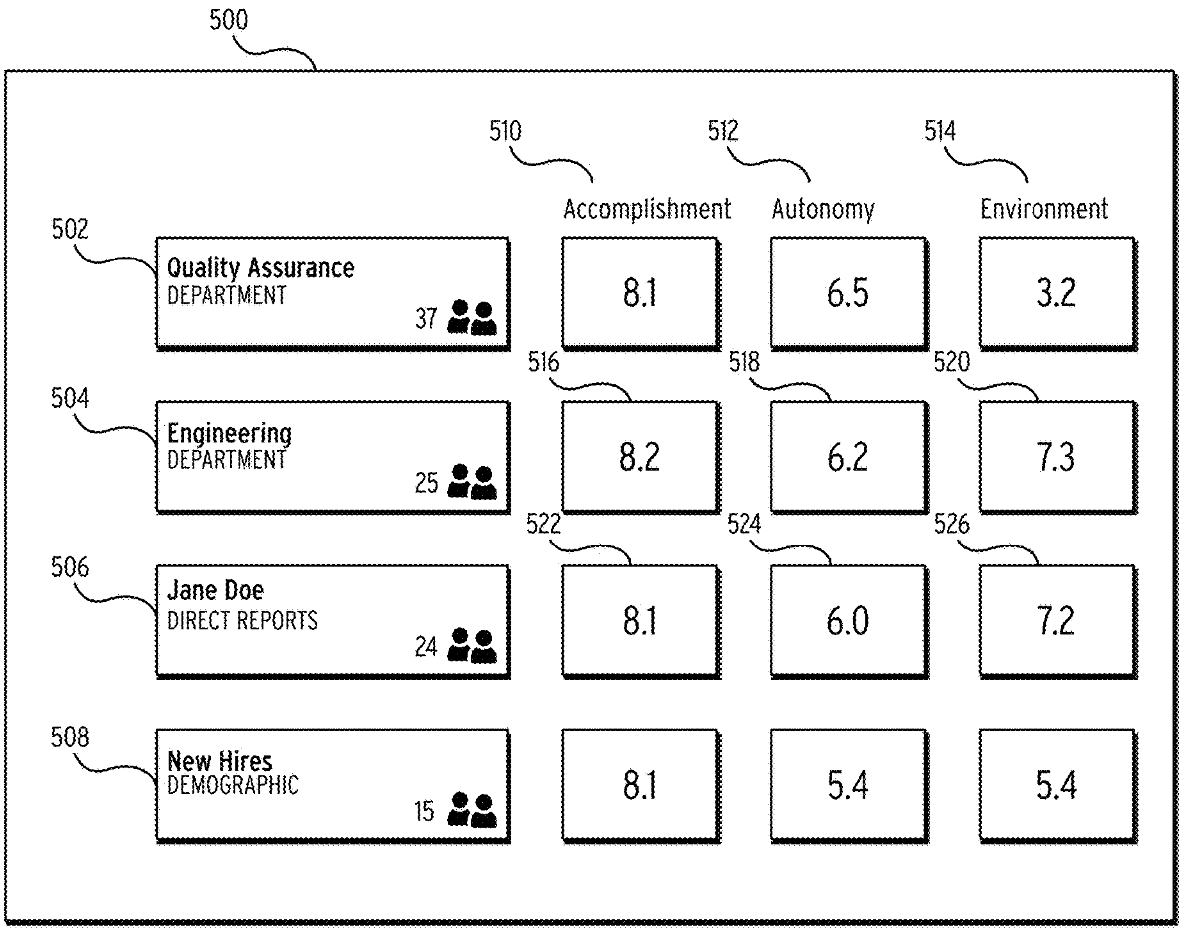
FIG. 5 is a screen diagram illustrating a graphical user interface (GUI) for presenting aggregated survey responses according to the example embodiments.

FIG. 5 is a screen diagram illustrating a graphical user interface (GUI) for presenting aggregated survey responses according to the example embodiments.

In an embodiment, the interface 500 presented to a user of an organization includes various segments such as quality assurance segment 502, engineering department segment 504, direct reports segment 506, and new hires segment 508. Certainly, additional, fewer, or different segments can be implemented. During the operation of segment manager 116, various users (depicted in the user count) are posited survey questions, and responses from each user are received. For example, users can be asked questions regarding an accomplishment category 510, an autonomy category 512, and an environment category 514. The specific categories are not limiting, and additional, fewer, or different categories can be used.

In an embodiment, for each category, all responses are aggregated across all users in a given segment. In some embodiments, the category corresponds to a single identical question. However, in other embodiments, the questions may be different yet related to the category.

As illustrated, the direct reports segment 506 includes an aggregated accomplishment answer 522 of 8.1, an aggregated autonomy answer 524 of 6.0, and an aggregated environment answer 526 of 7.2. As discussed, these represent the aggregated responses for each category for all users segmented as engineering direct reports. Similar to engineering department segment 504, the engineering department segment 504 includes an aggregated accomplishment answer 516 of 8.2, an aggregated autonomy answer 518 of 6.2, and an aggregated environment answer 520 of 7.3.

In the illustrated embodiment, the direct reports segment 506 and engineering department segment 504 differ by one user. For example, "Jane Doe" may be the manager of the engineering department segment 504. Thus, the rating of that user can be reverse-engineered despite being aggregated. At a minimum, a user viewing interface 500 can intuit that the additional user provided a ranking higher than the remaining twenty-four users. However, the user can further quantity this by computing an estimate of the extra user's ranking. For example, the user viewing interface 500 can induce that the extra user in engineering department segment 504 provided a rating between 9.4 and 10 (assuming a maximum scale of 10 and rounding of aggregates) to result in the 8.2 aggregate score for engineering department segment 504. Similarly for autonomy category 512, the user can induce that the extra user in engineering department segment 504 provided a rating between 9.8 and 10. Further, if the user has knowledge of the membership of engineering department segment 504 and direct reports segment 506, the user can ascribe this induced value to a specific user. For example, if the user viewing interface 500 knows that engineering department segment 504 includes all of direct reports segment 506 and the manager of the department, the user can ascribe the induced values to the specific individual.

While the foregoing example only describes four segments, the problem can quickly be exacerbated when hundreds or thousands of segments are used. In such a scenario, a user can "pick and choose" segments to identify specific individuals, thus comprising the anonymity of all users.

Returning to FIG. 1, the response engine 110 addresses this problem by forwarding responses to a bitmap manager 114 which manages segment membership bitmaps for all segments. Upon receiving a new response for a user, the bitmap manager 114 can identify the segments that a user belongs to. In an embodiment, bitmap manager 114 can load a user's segment membership by querying segment database 106 to receive a set of segment identifiers. Next, bitmap manager 114 can read bitmaps for each segment from bitmap database 108. In some embodiments, bitmap database 108 and querying segment database 106 can be combined. For example, the querying segment database 106 can include a table storing data of each segment (e.g., segment name, membership list, etc.) and this table can include a separate bitmap field storing the data described in bitmap database 108.

After retrieving a bitmap for a given segment associated with a user, the bitmap manager 114 can update the bitmap to include the user. Notably, the bitmap including users can differ in many respects with regard to the canonical list of users in a segment. Specifically, the bitmap represents users in a segment that have provided responses. Thus, as one example, the bitmap can be null or empty if no users in a segment have provided a response. In some embodiments, the bitmap can include more members than are currently present in the segment as users can be removed from segments after providing responses. In some embodiments, the members of a segment can be significantly greater than the members in the bitmap since members can be added (without providing responses) or not all members may have provided responses. Thus, bitmaps for segments are separate sets when compared to membership lists and only in some circumstances are the members in a bitmap fully encapsulated by the members of a segment. Thus, bitmaps can be processed independent of segment management operations (not illustrated).

In some embodiments, the bitmaps comprise compressed bitmaps to allow for rapid operations. In some embodiments, the bitmaps can comprise Roaring Bitmaps or similar compressed bitmaps.

After bitmap manager 114 updates the bitmaps for segments associated with a user, bitmap manager 114 can persist the bitmaps to response database 104. In some embodiments, bitmap manager 114 can further pre-compute a set of overlaps. Pre-computed overlaps refer to overlapping segments that have already been determined based on past computations. In some embodiments, these pre-computed overlaps are stored in overlap database 122. In an embodiment, upon initialization, the overlap database 122 includes no overlaps. In such a scenario, bitmap manager 114 can initiate a background job that computes all pairwise comparisons between segments (via bitmaps) and stores the resulting overlap sets in overlap database 122. As used herein, an overlap refers to a set of users appearing in both bitmaps of a bitmap pair (the shared users). In some embodiments, during this initialization, bitmap manager 114 may only write those bitmap pairs that have an overlap greater than zero in survey database 120. In some embodiments, bitmap manager 114 can write the segment identifiers over the overlapping segments to the overlap database 122. In some embodiments, the bitmap manager 114 can also write the overlapping bitmaps to the overlap database 122.

In a second scenario, if the overlap database 122 includes overlaps, the bitmap manager 114 identifies any overlaps corresponding to the pairs of bitmaps for a given user response received from response engine 110. If the bitmap manager 114 determines that the user's segments have overlapped with other segments in the past, bitmap manager 114 can update the overlap by performing another comparison between the newly updated bitmaps and the bitmaps of the matching overlap stored in overlap database 122. For example, if a user belongs to the engineering and new hires segments, and the overlap database 122 stores a new hires to New York segment overlap, bitmap manager 114 can recompute this segment overlap by using the new bitmap generated for the new hires segment (since the response is associated with this segment) and the current New York segment bitmap. In some embodiments, the result will be confirming that the overlap still exists and, in this case, bitmap manager 114 writes the confirming overlap to overlap database 122. In other scenarios, bitmap manager 114 may determine that the overlap no longer exists and may remove the overlap from overlap database 122.

The network platform 118 further includes a segment manager 116. In an embodiment, segment manager 116 receives request for segment-level data from client devices 112. For example, a user of one of the client devices 112 may request aggregated segment response data for all segments they are authorized to view. In response, segment manager 116 can load all segment responses from response database 104 for filtering. To filter responses, segment manager 116 can first check the overlaps cached in overlap database 122. For example, segment manager 116 can use each segment from querying segment database 106 that is associated with the user requesting segment-level data to query the overlap database 122. In response, the overlap database 122 returns a set of overlapping segments. Next, segment manager 116 can determine if the segments associated with the user include any segment overlapping with a given segment. If so, the segment manager 116 can remove one or both of the segments from segments authorized for the user. Since the overlap database 122 stores cached segment overlaps, this process can greatly reduce the most commonly overlapping segments and can capture most (and frequently all) overlaps. However, the segment manager 116 can further manually process all remaining segments using bitmaps from bitmap database 108. Specifically, the segment manager 116 can perform pairwise comparisons for all remaining segments (via their associated bitmaps) to identify segment pairs that overlap according to a specified threshold (e.g., only include one non-overlapping user). The segment manager 116 can thus identify any non-cached overlaps and filter those pairs from the final list of segments. Further, segment manager 116 can write those identifier overlaps to overlap database 122 in a similar manner to bitmap manager 114 to cache newly discovered overlaps.

Once the segment manager 116 filters the authorized segments, segment manager 116 can return aggregate data for the filtered segments to the client devices 112 for display. For example, segment manager 116 can return aggregate scores related to survey questions for the filtered segments in question. One example of such a display is depicted in FIG. 6.

Figure 6:
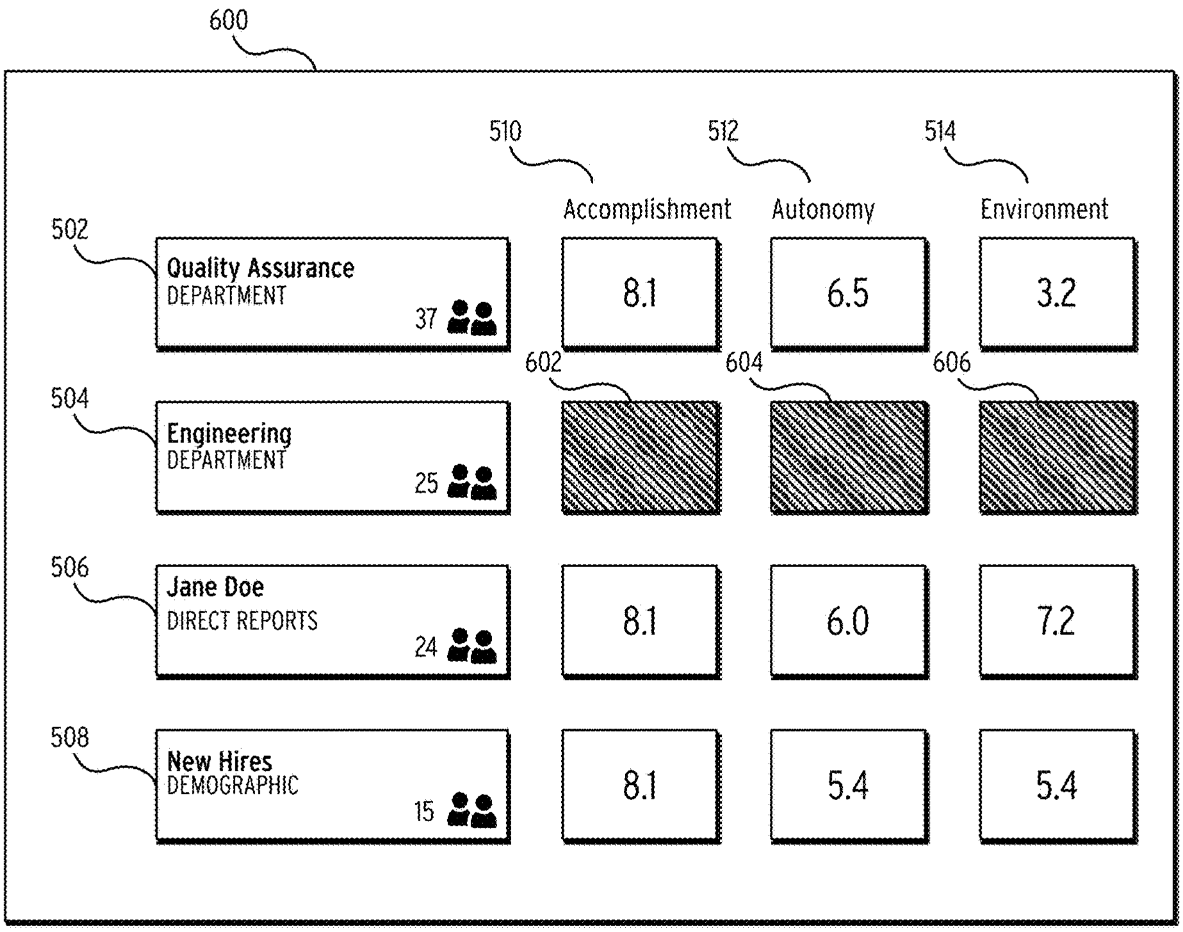
FIG. 6 is a screen diagram illustrating a GUI for presenting anonymized aggregated survey responses according to the example embodiments.

FIG. 6 is a screen diagram illustrating a graphical user interface (GUI) for presenting anonymized aggregated survey responses according to the example embodiments.

Various elements bearing the same reference numbers described in FIG. 5 are not described again for the sake of brevity. In the illustrated embodiment, in contrast to interface 500, the interface 600 includes anonymized segment data. Specifically, the aggregated accomplishment answer 602, aggregated autonomy answer 604, and aggregated environment answer 606 are removed from display. In some embodiments, for a given overlapping segment pair, segment manager 116 may remove from view the segment having the larger number of members (or vice versa) and may explicitly obfuscate the removed segment data (as illustrated). In some embodiments, segment manager 116 will retain an identifier of the obfuscated segment (e.g., engineering department segment 504) to maintain transparency of the removal. In other embodiments, segment manager 116 can remove all identifying information of the removed segment to thus hide the segment entirely. In some embodiments, segment manager 116 can additionally provide an explanation or tip for why the segment was removed.

Figure 2:
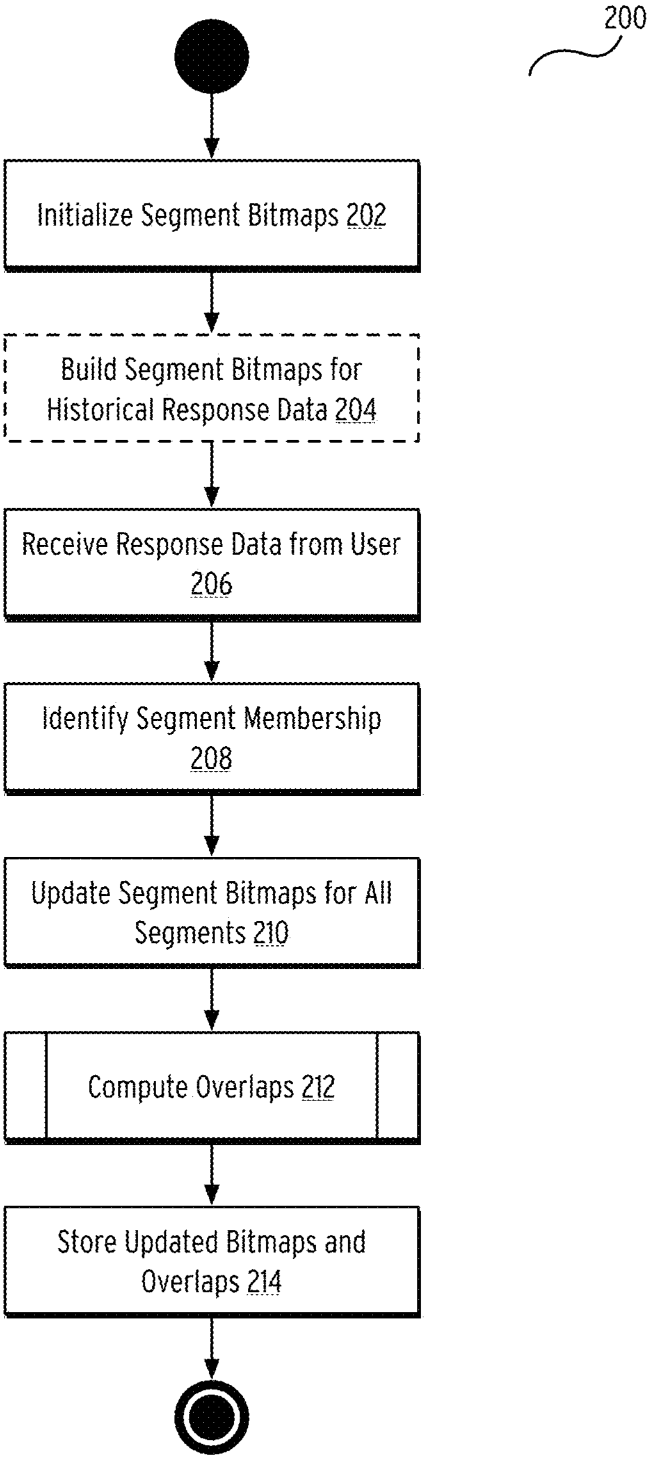
FIG. 2 is a flow diagram illustrating a method for creating and updating bitmaps according to some of the example embodiments.

FIG. 2 is a flow diagram illustrating a method for creating and updating bitmaps according to some of the example embodiments.

In step 202, method 200 can include initializing segment bitmaps.

In some embodiments, each segment can be initialized at a starting point to have an empty bitmap. In some embodiments, step 202 can be executed upon launch and a set of existing segments can be assigned an empty bitmap. As described above, in some embodiments, the bitmaps used herein are compressed bitmaps such as Roaring Bitmaps. In some embodiments, step 202 can be optional, and bitmaps can be assigned lazily. That is, upon detecting a null bitmap (e.g., an absence of a bitmap), method 200 can automatically assign an initial (e.g., empty) bitmap. In some embodiments, an empty bitmap refers to a null set or similar set.

For the following description, three segments ("Engineering," "Jane Doe Direct Reports," "New York") are used as example segments. In this example, step 202 may initialize three bitmaps ($b_e$, $b_r$, $b_n$) corresponding to these three example segments, respectively. Further, the underlying set of users represented by the bitmaps $b_e$, $b_r$, and $b_n$ may be represented as $S_e$, $S_r$, $S_n$ such that for a set of all users U, $U \supset S_i$. Certainly, a production deployment may include hundreds, thousands, or hundreds of thousands of differing and potentially overlapping segments. For future steps, it can be assumed that $|S_e \cap S_r|>0$, that is the intersection of Engineering members and Engineering Direct Report members is non-zero. The example should not be construed as limiting.

In step 204, method 200 can include building or bootstrapping segment bitmaps based on historical response data. In some embodiments, step 204 is optional. However, in some embodiments, method 200 can be executed after response data has been collected. In such a scenario, step 204 can be executed to populate the initial bitmaps based on currently collected response data. In an embodiment, method 200 loads all historical responses and iterates through each historical response. For each response, method 200 can extract a user identifier and a set of segments. Then, for each response, method 200 can add the user identifier to each initialized bitmap for each segment. In some embodiments, method 200 can further serialized the bitmaps before persisting the bitmaps to storage. Continuing the previous example, the sets $S_e$, $S_r$, $S_n$ may be bootstrapped such that $|S_e|=24$, $|S_r|=24$, and $|S_n|=20$.

In step 206, method 200 can include receiving response data from a single user. Although a single user is discussed, step 206 through step 214 can be executed for multiple users simultaneously or in sequence.

In the illustrated embodiment, response data can comprise an answer to a survey question or similar data. In some embodiments, the response data includes the answer and a user identifier of the user providing the response. For example, the response can be included a question presented to the user by an HR system or similar network platform, as described previously. Continuing the previous example, a given user $u_i \in U$ submits a response to a question. In the example, user $u_i$ may be the manager of the engineering department.

In step 208, method 200 can include identifying a segment membership for the response data.

In some embodiments, the segment membership comprises a set of segment names or identifiers that are associated with a given user and/or response. In some embodiments, the segment identifiers are included within the response data. In other embodiments, however, the segment identifiers can be stored in a segment database and associated with a user identifier in a one-to-many fashion. In some embodiments, method 200 can query a segment database using the user identifier to load a set of segment identifiers that the user is associated with. Continuing the previous example, method 200 can determine that user $u_i$ is a member of the Engineering and New York segments based on a pre-stored segment membership in the segment database.

Notably, method 200 does not depict the processing of responses as performed, for example, by response engine 110 and that disclosure is incorporated herein in its entirety.

In step 208, method 200 can include updating the bitmaps for all identified segments.

In an embodiment, method 200 can include deserializing the bitmaps for all identified segments and adding the user identifier to the deserialized bitmaps. In some embodiments, the bitmaps can be represented as a set and thus if the user already appears in the bitmap, method 200 will not add a second instance of the user to the bitmap.

Continuing the foregoing example, method 200 can load bitmaps $b_e$ and $b_n$ (corresponding to sets $S_e$ and $S_n$) from the segment database or bitmap database. Method 200 can then deserialized the bitmaps and add the user identifier ($id_i$) of user $u_i$ to the bitmaps to generate new bitmaps $b'_e$ and $b'_n$. In this example, method 200 may determine that $b_e$ and $b_n$ did not include $id_i$ and thus proceeds to add the user identifier to the bitmaps (and thus to sets $S_e$ and $S_n$). After adding the user identifier to the bitmaps, the cardinality of the segments will be updated to equal $|S_e|=25$, $|S_r|=24$, and $|S_n|=21$. Further, at a minimum $S_e-S_r \approx \{id_i\}$ given that $id_i$ was added to $S_e$ and the number of users in $S_e$ and not in $S_r$ includes at least $id_i$ (and potentially other users).

Figure 3:
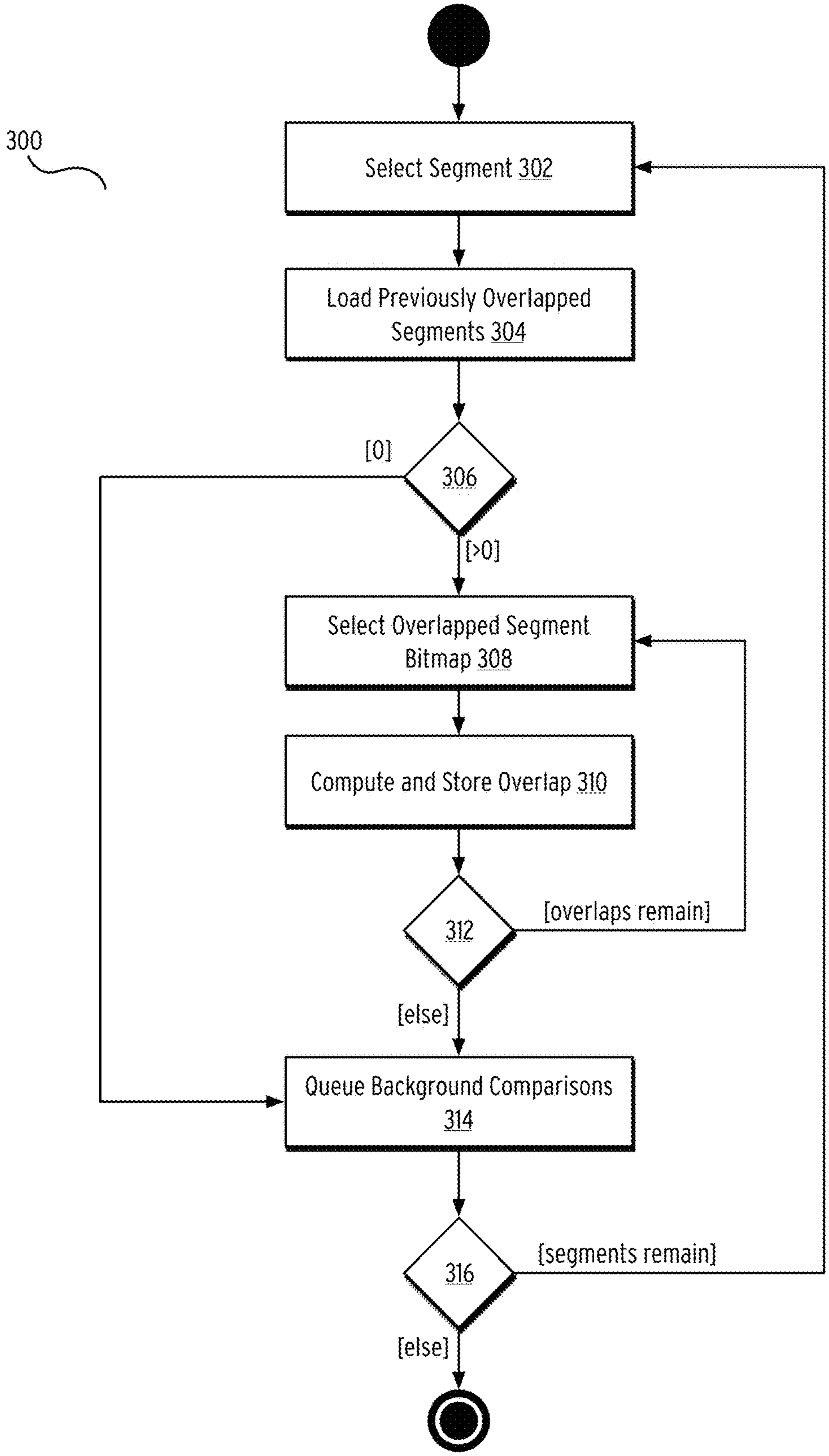
FIG. 3 is a flow diagram illustrating a method for computing overlaps according to some of the example embodiments.

In step 212, method 200 can include computing overlaps. FIG. 3 provides examples of implementations of step 212 and is not repeated herein. In brief, in step 212, method 200 computes the overlaps between some or all pairs of segments in the system. In some embodiments, method 200 can compute the intersection of two sets of a pair and use the intersection as the overlap. An intersection can then be used to subtract from each of the pairs during runtime to determine how many users are not in the intersection. Alternatively, method 200 computes a set subtraction between the sets in a pair to compute an overlap. As will be discussed, pre-computed overlaps can be used to improve performance and offload more computationally expensive processing. In the example, only $S_e$ and $S_r$ overlap and thus the overlap is computed for this pair.

In some embodiments, the processing step 210 and the processing in step 212 can be performed by an application server communicating with a database. In other embodiments, however, the processing step 210 and the processing in step 212 can be performed directly by the database itself, without incurring network latency penalties.

In step 214, method 200 can include storing the updated bitmaps and overlaps. In some embodiments, the updated bitmaps can be stored in the segment database or in a separate storage device. In some embodiments, the overlaps can be stored in a separate storage device or as an array or hash in a segment record of the segment database.

FIG. 3 is a flow diagram illustrating a method for computing overlaps according to some of the example embodiments. In some embodiments, method 300 can be used to implement step 212 of FIG. 2.

In step 302, method 300 can include selecting a segment. In some embodiments, the segment can be selected from a list of segments associated with a user submitting a response. In other embodiments, the segment can be selected from a list of all segments known to the system. The sets $S_e$, $S_r$, and $S_n$ discussed in FIG. 2 are re-used herein as an example.

In step 304, method 300 can include loading previously overlapping segments. In some embodiments, method 300 may skip step 304 during an initial execution. However, in later executions, method 300 may load any overlapping segments that were identified in step 310 of the previous execution(s) of method 300. In essence, method 300 loads a set of most recently cached segment pairs that overlap.

In step 306, method 300 determines if any such overlapping segments exist. If not, method 300 can proceed directly to step 314 (discussed later). If, however, overlapping segments exist, method 300 proceeds to step 308.

In step 308, method 300 can include selecting an overlapping segment bitmap. As discussed previously, pre-existing overlapping segments may be stored separately and accessed sequentially or in parallel during step 308. In an embodiment, method 300 can deserialize the bitmaps for these pre-existing overlapping segments to generate the sets that resulted in the overlap.

In step 310, method 300 can include re-computing the pre-existing overlapping segments.

In some embodiments, method 300 is triggered in response to a response. As described in FIG. 2, as part of this response, method 200 recomputes segment bitmaps for each segment associated with a user. However, the pre-existing overlapping segments are associated with historical bitmaps used to calculate the overlap in a previous execution. Thus, in step 310, method 300 replaces one or both of the bitmaps used to compute the pre-existing overlapping segments with the new bitmap(s) that include the user associated with a response.

Then, method 300 computes the overlap between the updated bitmaps for the pre-existing overlapping segments. In some embodiments, method 300 includes computing the intersection or subtraction between the sets. In some embodiments, method 300 can determine if the newly computed overlap should be saved. That is, if the newly computed overlap indicates no overlap between the sets, method 300 may remove the pre-existing overlapping segments from the cache. Alternatively, if the overlap is the same or includes additional users, method 300 can update the pre-existing overlapping segment in the cache.

Continuing the example of FIG. 2, sets $S_e$ and $S_r$ include 25 and 24 members respectively. In the example, the intersection of $S_e$ and $S_r$ may have a cardinality of 24 and the subtraction of $S_e$ and $S_r$ may have a cardinality of one. Either value can be used to represent the overlap. If a new response is received identifying $S_r$ as a segment, the cardinality of $S_r$ may be updated to be 25 by adding the new user to the set, as such the cardinalities of $S_e$ and $S_r$ are now equal. In such a scenario, step 310 may remove the pair from the cache since there is no risk of exposing per-user data. Similarly, if the new user was assigned to the segment $S_e$, the cardinality of $S_e$ would be updated to 26. If the subtraction of $S_e$ and $S_r$ is then equal to two, method 300 may remove the pair since there is a low risk of exposing per-user data. However, in some embodiments, a threshold difference can be tuned since exposing two users may be undesirable. For example, method 300 may require that the subtraction be greater than ten before de-classifying the pair as an overlap. As another example, if the user is associated with both $S_e$ and $S_r$, the subtraction remains the same, and the method 300 may retain the pair of segments as an overlap.

In step 312, method 300 then determines if all overlapping segment pairs have been processed. If so, method 300 re-executes step 308 and step 310 for each remaining overlapping segment pair.

In step 316, method 300 can queue background comparisons for remaining segment pairs. In some embodiments, these comparisons can comprise all system segment pairs that are not loaded in step 304. In another embodiment, the comparisons can include all comparisons that implicate a given user's segment. In some embodiments, for each such comparison, method 300 can execute the processing in step 308 and 310 for each pair.

Continuing the example of FIG. 2, a given user u; is associated with two segments $S_e$ and $S_n$ but only one cached overlapping pair ($S_e$ and $S_r$) has been proceed by method 300. Thus, in step 316, method 300 can compare every pairwise combination of segments excluding the pair $S_e$ and $S_r$. Alternatively, method 300 can generate all pairs that include $S_n$ and $S_e$ (excluding the pair $S_e$ and $S_r$) since pairs that do not include the user's pairs will necessarily not be updated.

As illustrated, this process can be executed as a background process to immediately update all known pairs while processing all possible pairs in the background. As such, method 300 can update the highest likelihood overlaps quickly and defer processing of unlikely overlaps in a background job.

In step 316, method 300 determines if all segments have been processed. As described above, method 300 can be executed for each segment associated with a user (e.g., $S_e$ and $S_n$ for user $u_i$), thus method 300 can run for each identified segment for a user. Once all segments for a user are processed, method 300 can terminate or cede control to a calling process (e.g., method 200).

Figure 4:
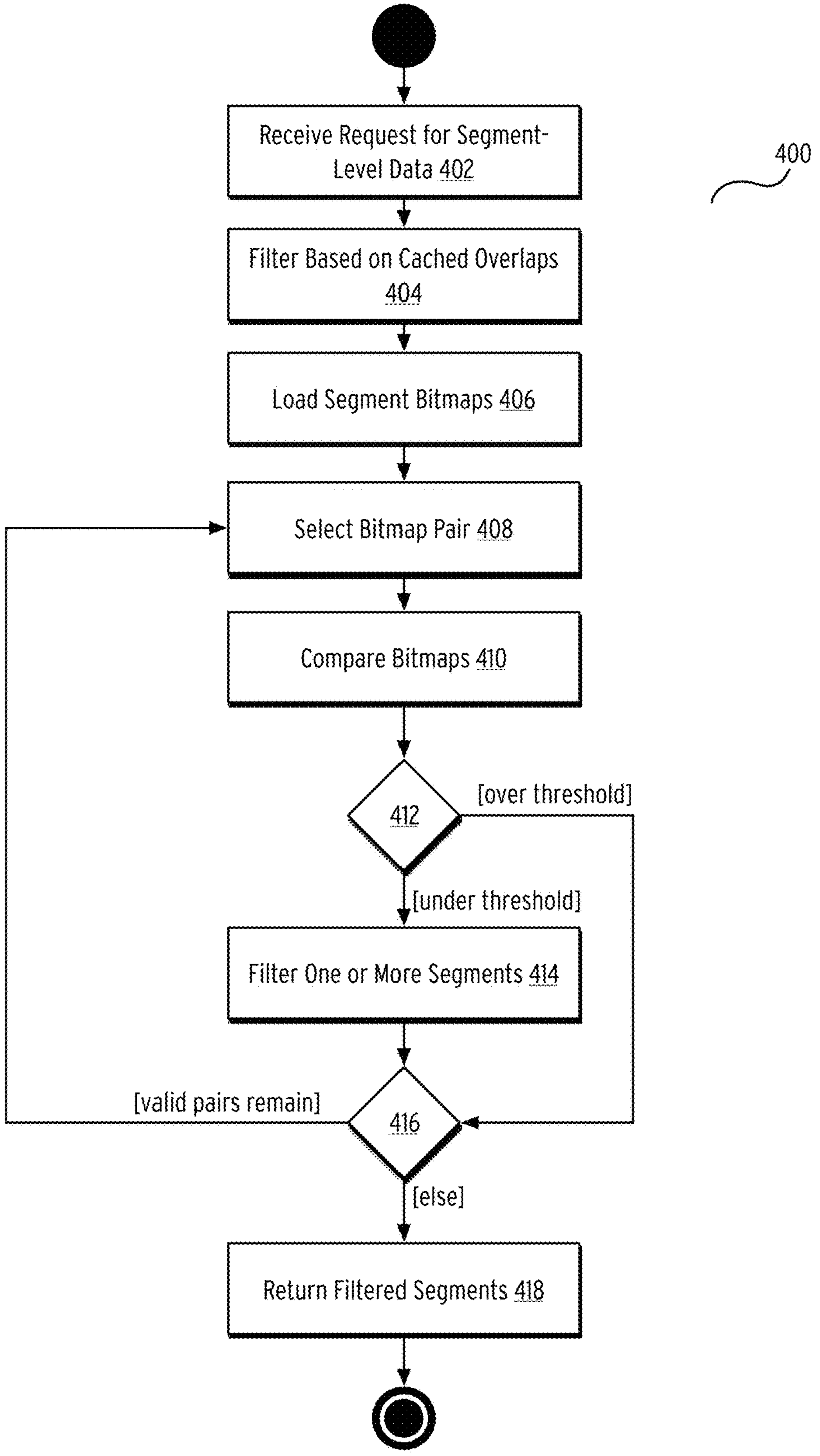
FIG. 4 is a flow diagram illustrating a method for using bitmaps to anonymize segment-level data according to some of the example embodiments.

FIG. 4 is a flow diagram illustrating a method for using bitmaps to anonymize segment-level data according to some of the example embodiments.

In step 402, method 400 can include receiving a request for segment-level data. In an embodiment, a user can request segment-level aggregated data from method 400. For example, a user can request aggregated survey response data for one or more segments. In some embodiments, step 402 can include identifying all segments that a requesting user is authorized to access and using this list as an unfiltered list of segments.

In step 404, method 400 can include filtering the unfiltered list of segments based on cached overlaps.

As described in connection with FIG. 3, a set of segment pairs and their overlapping users can be cached for quicker lookups. In step 404, method 400 can use the identifiers of the unfiltered list of segments to load any and all overlapping segment pairs that are already cached. In response, method 400 can then identify which overlaps exceed a threshold. For example, method 400 can determine which overlaps include segments that differ by a fixed number of users (e.g., one user). Once identifying these overlaps, method 400 can build a list of problematic segments (as a set) and filter the unfiltered list of segments to exclude some or all of these problematic segments. For example, for each overlap that exceeds the threshold, method 400 can flag the segment having more members as a segment to exclude and exclude the segment from the unfiltered list of segments. In some embodiments, step 404 can be used to reduce the cardinality of the list of segments prior to further processing, improving performance and speed of the computation.

In step 406, method 400 can include loading segment bitmaps for each segment in the list of segments. As discussed above, this list can be pre-filtered in step 404 and thus only include segments that appearing in the cached list of overlaps. As such, method 400 can load the bitmaps for each remaining segment from a segment database or bitmap database. As part of step 406, method 400 can generate a set of bitmap pairs using the segments in the list of segments. For example, method 400 can compute all pairwise combinations of the segments in the list of segments and all known segments.

In step 408, method 400 can include selecting a bitmap pair generated in step 406 and, in step 410, can include comparing the bitmaps. Details of comparing bitmaps to generate an overlap were described in step 310 and are not repeated herein.

In step 412, method 400 can include determining if the overlap exceeds a threshold. As discussed in step 404, the threshold can be used to determine if the difference or subtract in users between two bitmaps can be used as the value to compare to the threshold. In some embodiments, method 400 determines if this difference exceeds the threshold. If so, method 400 will retain the segment pair in the list.

In step 414, however, if method 400 determines that the overlap exceeds the threshold, method 400 will further filter the list of segments to remove one or all of the segments associated with the bitmap pair. For example, for each overlap that exceeds the threshold, method 400 can flag the segment having more members as a segment to exclude and exclude the segment from the unfiltered list of segments.

In step 416, method 400 determines if any bitmap pairs remain. If so, method 400 continues to execute step 408, step 410, step 412, and step 414 for each remaining pair. If not, method 400 proceeds to step 418.

In step 418, method 400 can include returning the filtered segments. As discussed in connection with FIG. 6, method 400 can provide an API response that includes only segments that were not filtered in the above process. Alternatively, method 400 can provide a GUI or similar interface that hides or obfuscates filtered segment-level data.

In the foregoing descriptions, sets are sometimes utilized to illustrate operations. However, in operation, all computation may be performed using condensed bitmaps to improve speed and set notation is used solely to explain the operations.

Figure 7:
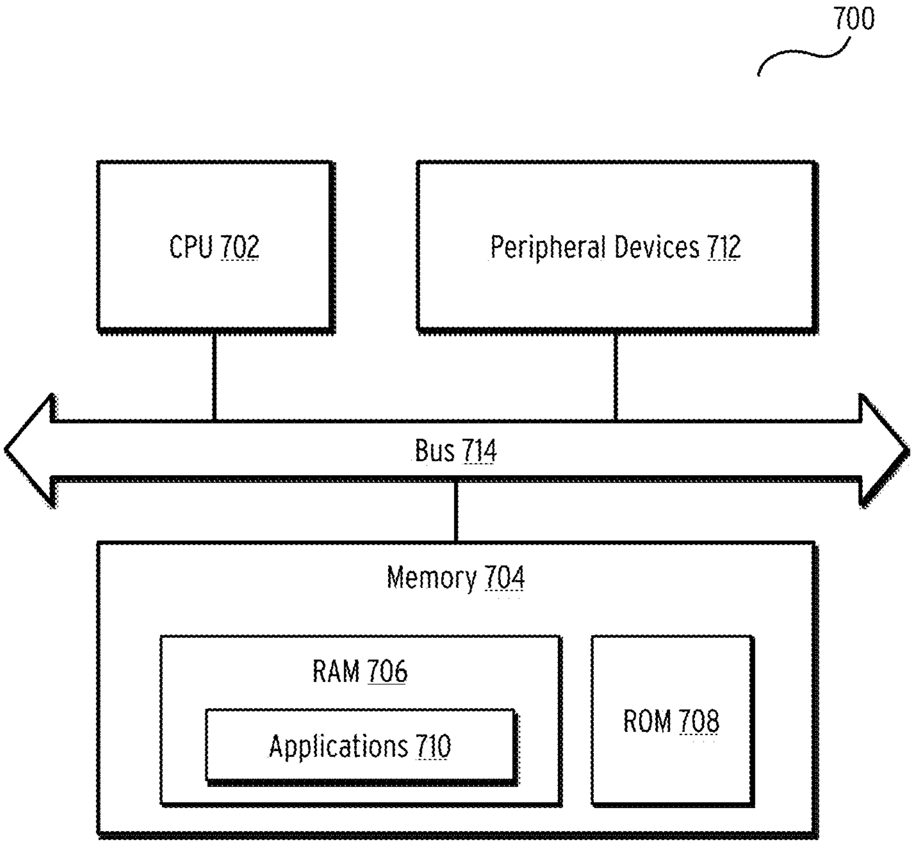
FIG. 7 is a block diagram of a computing device according to some embodiments of the disclosure.

FIG. 7 is a block diagram of a computing device according to some embodiments of the disclosure.

As illustrated, the computing device 700 includes a processor or central processing unit (CPU) such as CPU 702 in communication with a memory 704 via a bus 714. The device also includes one or more input/output (I/O) or peripheral devices 712. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 702 may comprise a general-purpose CPU. The CPU 702 may comprise a single-core or multiple-core CPU. The CPU 702 may comprise a system-on-a-chip (SoC) or a similar embedded system. In some embodiments, a graphics processing unit (GPU) may be used in place of, or in combination with, a CPU 702. Memory 704 may comprise a non-transitory memory system including a dynamic random-access memory (DRAM), static random-access memory (SRAM), Flash (e.g., NAND Flash), or combinations thereof. In one embodiment, the bus 714 may comprise a Peripheral Component Interconnect Express (PCIe) bus. In some embodiments, bus 714 may comprise multiple busses instead of a single bus.

Memory 704 illustrates an example of non-transitory computer storage media for the storage of information such as computer-readable instructions, data structures, program modules, or other data. Memory 704 can store a basic input/output system (BIOS) in read-only memory (ROM), such as ROM 708, for controlling the low-level operation of the device. The memory can also store an operating system in random-access memory (RAM) for controlling the operation of the device.

Applications 710 may include computer-executable instructions which, when executed by the device, perform any of the methods (or portions of the methods) described previously in the description of the preceding Figures. In some embodiments, the software or programs implementing the method embodiments can be read from a hard disk drive (not illustrated) and temporarily stored in RAM 706 by CPU 702. CPU 702 may then read the software or data from RAM 706, process them, and store them in RAM 706 again.

The device may optionally communicate with a base station (not shown) or directly with another computing device. One or more network interfaces in peripheral devices 712 are sometimes referred to as a transceiver, transceiving device, or network interface card (NIC).

An audio interface in peripheral devices 712 produces and receives audio signals such as the sound of a human voice. For example, an audio interface may be coupled to a speaker and microphone (not shown) to enable telecommunication with others or generate an audio acknowledgment for some action. Displays in peripheral devices 712 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 712 may comprise any input device arranged to receive input from a user. An illuminator in peripheral devices 712 may provide a status indication or provide light. The device can also comprise an input/output interface in peripheral devices 712 for communication with external devices, using communication technologies, such as USB, infrared, Bluetooth™, or the like. A haptic interface in peripheral devices 712 provides tactile feedback to a user of the client device.

A GPS receiver in peripheral devices 712 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown in FIG. 7, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, can be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can, in fact, be executed substantially concurrently, or the blocks can sometimes be executed in the reverse order, depending upon the functionality or acts involved.

These computer program instructions can be provided to a processor of a general-purpose computer to alter its function to a special purpose; a special purpose computer; ASIC; or other programmable digital data processing apparatus, such that the instructions, which execute via the processor of the computer or other programmable data processing apparatus, implement the functions or acts specified in the block diagrams or operational block or blocks, thereby transforming their functionality in accordance with embodiments herein.

For the purposes of this disclosure, a computer-readable medium (or computer-readable storage medium) stores computer data, which data can include computer program code or instructions that are executable by a computer, in machine-readable form. By way of example, and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage, or other magnetic storage devices, or any other physical or material medium which can be used to tangibly store the desired information or data or instructions and which can be accessed by a computer or processor.

For the purposes of this disclosure, a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer-readable medium for execution by a processor. Modules may be integral to one or more servers or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than or more than all the features described herein are possible.

Functionality may also be, in whole or in part, distributed among multiple components, in manners now known or to become known. Thus, a myriad of software, hardware, and firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

I claim:

1. A method comprising:

receiving, by a processor, a network request identifying a user;

identifying, by the processor, a plurality of segments associated with the user;

loading, by the processor, bitmaps associated with the plurality of segments, each bitmap representing a set of users who have provided responses within a corresponding segment;

generating, by the processor, overlaps by comparing pairs of bitmaps selected from the bitmaps, each overlap identifying shared users appearing in both bitmaps of a bitmap pair;

determining, by the processor, a difference in cardinality between overlapping segment pairs;

generating, by the processor, anonymized segments by excluding, from the plurality of segments, at least one segment of an overlapping segment pair when the difference in cardinality is below a specified threshold, wherein the excluded segment is the segment having a greater number of members in the overlapping segment pair; and returning, by the processor, aggregated data associated with the anonymized segments in response to the network request, the aggregated data omitting data associated with the excluded segment.

2. The method of claim 1, further comprising: receiving response data associated with a second user; identifying a plurality of matching segments for the second user; and updating a plurality of matching bitmaps corresponding to the plurality of matching segments using an identifier of the second user.

3. The method of claim 1, wherein generating the overlaps comprises: computing an intersection or subtraction between sets represented by the pairs of bitmaps; and identifying pairs of bitmaps as overlapping based on the computed intersection or subtraction.

4. The method of claim 1, further comprising: maintaining a historical set of overlaps, the historical set of overlaps comprising a set of previously computed overlaps; selecting an overlapping segment bitmap from the historical set of overlaps; and re-computing the overlap for the selected overlapping segment bitmap using updated bitmaps.

5. The method of claim 1, wherein generating the anonymized segments comprises: determining a difference in cardinality between overlapping segment pairs; and excluding segments from the anonymized segments when the difference in cardinality is below a specified threshold.

6. The method of claim 1, further comprising: storing the generated overlaps in an overlap database; and querying the overlap database to obtain a cached set of overlaps for use in generating the anonymized segments.

7. The method of claim 1, wherein returning the aggregated data comprises: removing aggregated data associated with excluded overlapping segments from the returned data; and providing an explanation for why certain segment data was removed.

8. A non-transitory computer-readable storage medium for tangibly storing computer program instructions capable of being executed by a computer processor, the computer program instructions defining steps of:

receiving a network request identifying a user;

identifying a plurality of segments associated with the user;

loading bitmaps associated with the plurality of segments, each bitmap representing a set of users who have provided responses within a corresponding segment;

generating overlaps by comparing pairs of bitmaps selected from the bitmaps, each overlap identifying shared users appearing in both bitmaps of a bitmap pair;

determining a difference in cardinality between overlapping segment pairs;

generating anonymized segments by excluding, from the plurality of segments, at least one segment of an overlapping segment pair when the difference in cardinality is below a specified threshold, wherein the excluded segment is the segment having a greater number of members in the overlapping segment pair; and returning aggregated data associated with the anonymized segments in response to the network request, the aggregated data omitting data associated with the excluded segment.

9. The non-transitory computer-readable storage medium of claim 8, further comprising: receiving response data associated with a second user; identifying a plurality of matching segments for the second user; and updating a plurality of matching bitmaps corresponding to the plurality of matching segments using an identifier of the second user.

10. The non-transitory computer-readable storage medium of claim 8, wherein generating the overlaps comprises: computing an intersection or subtraction between sets represented by the pairs of bitmaps; and identifying pairs of bitmaps as overlapping based on the computed intersection or subtraction.

11. The non-transitory computer-readable storage medium of claim 8, the steps further comprising: maintaining a historical set of overlaps, the historical set of overlaps comprising a set of previously computed overlaps; selecting an overlapping segment bitmap from the historical set of overlaps; and re-computing the overlap for the selected overlapping segment bitmap using updated bitmaps.

12. The non-transitory computer-readable storage medium of claim 8, wherein generating the anonymized segments comprises: determining a difference in cardinality between overlapping segment pairs; and excluding segments from the anonymized segments when the difference in cardinality is below a specified threshold.

13. The non-transitory computer-readable storage medium of claim 8, the steps further comprising: storing the generated overlaps in an overlap database; and querying the overlap database to obtain a cached set of overlaps for use in generating the anonymized segments.

14. The non-transitory computer-readable storage medium of claim 8, wherein returning the aggregated data comprises: removing aggregated data associated with excluded overlapping segments from the returned data; and providing an explanation for why certain segment data was removed.

15. A device comprising:

a processor; and a storage medium for tangibly storing thereon program logic for execution by the processor, the program logic comprising:

logic, executed by the processor, for receiving a network request identifying a user;

logic, executed by the processor, for identifying a plurality of segments associated with the user;

logic, executed by the processor, for loading bitmaps associated with the plurality of segments, each bitmap representing a set of users who have provided responses within a corresponding segment;

logic, executed by the processor, for generating overlaps by comparing pairs of bitmaps selected from the bitmaps, each overlap identifying shared users appearing in both bitmaps of a bitmap pair;

logic, executed by the processor, for determining a difference in cardinality between overlapping segment pairs;

logic, executed by the processor, for generating anonymized segments by excluding, from the plurality of segments, at least one segment of an overlapping segment pair when the difference in cardinality is below a specified threshold, wherein the excluded segment is the segment having a greater number of members in the overlapping segment pair; and logic, executed by the processor, for returning aggregated data associated with the anonymized segments in response to the network request, the aggregated data omitting data associated with the excluded segment.

16. The device of claim 15, the program logic further comprising logic, executed by the processor, for: receiving response data associated with a second user; identifying a plurality of matching segments for the second user; and updating a plurality of matching bitmaps corresponding to the plurality of matching segments using an identifier of the second user.

17. The device of claim 15, wherein generating the overlaps comprises: computing an intersection or subtraction between sets represented by the pairs of bitmaps; and identifying pairs of bitmaps as overlapping based on the computed intersection or subtraction.

18. The device of claim 15, the program logic further comprising logic, executed by the processor, for: maintaining a historical set of overlaps, the historical set of overlaps comprising a set of previously computed overlaps; selecting an overlapping segment bitmap from the historical set of overlaps; and re-computing the overlap for the selected overlapping segment bitmap using updated bitmaps.

19. The device of claim 15, wherein generating the anonymized segments comprises: determining a difference in cardinality between overlapping segment pairs; and excluding segments from the anonymized segments when the difference in cardinality is below a specified threshold.

20. The device of claim 15, the program logic further comprising logic, executed by the processor, for: storing the generated overlaps in an overlap database; and querying the overlap database to obtain a cached set of overlaps for use in generating the anonymized segments.

* * * * *